United States Patent [19]

Beierholm et al.

[11] Patent Number: 4,547,842

[45] Date of Patent: Oct. 15, 1985

[54] ELECTRICAL SHOCK PREVENTION MEANS FOR HIGH VOLTAGE DC REGULATORS

[75] Inventors: Hans M. Beierholm, Fynshav; Niels Thun, Stenderup, both of Denmark

[73] Assignee: Danfoss A/S, Nordborg, Denmark

[21] Appl. No.: 543,901

[22] Filed: Oct. 20, 1983

[30] Foreign Application Priority Data

Nov. 16, 1982 [DE] Fed. Rep. of Germany ....... 3242316

[51] Int. Cl.$^4$ ............................................. H02M 5/42
[52] U.S. Cl. ....................................... 363/35; 363/86; 323/266; 323/285; 307/326
[58] Field of Search ............... 323/266, 285; 330/258, 330/260, 261; 363/35, 37, 86, 89; 307/126, 326

[56] References Cited

U.S. PATENT DOCUMENTS

| | | | |
|---|---|---|---|
| 3,930,193 | 12/1975 | Kornrumpf et al. | 363/37 |
| 3,986,100 | 10/1976 | Beirerholm et al. | 363/37 |
| 4,119,906 | 10/1978 | Gonda | 363/35 |
| 4,258,308 | 3/1981 | Weischedel | 323/285 |
| 4,442,339 | 4/1984 | Mizuno et al. | 323/285 |

Primary Examiner—William H. Beha, Jr.
Assistant Examiner—Jeffrey Sterrett
Attorney, Agent, or Firm—Wayne B. Easton

[57] ABSTRACT

The invention relates to apparatus for supplying an electric consumer with a high DC voltage which includes provisions for minimizing the danger and hazard of electrical shocks associated therewith. The apparatus includes a power circuit and a measuring control circuit which are separated by high ohmic resistors and an optocoupler.

8 Claims, 1 Drawing Figure

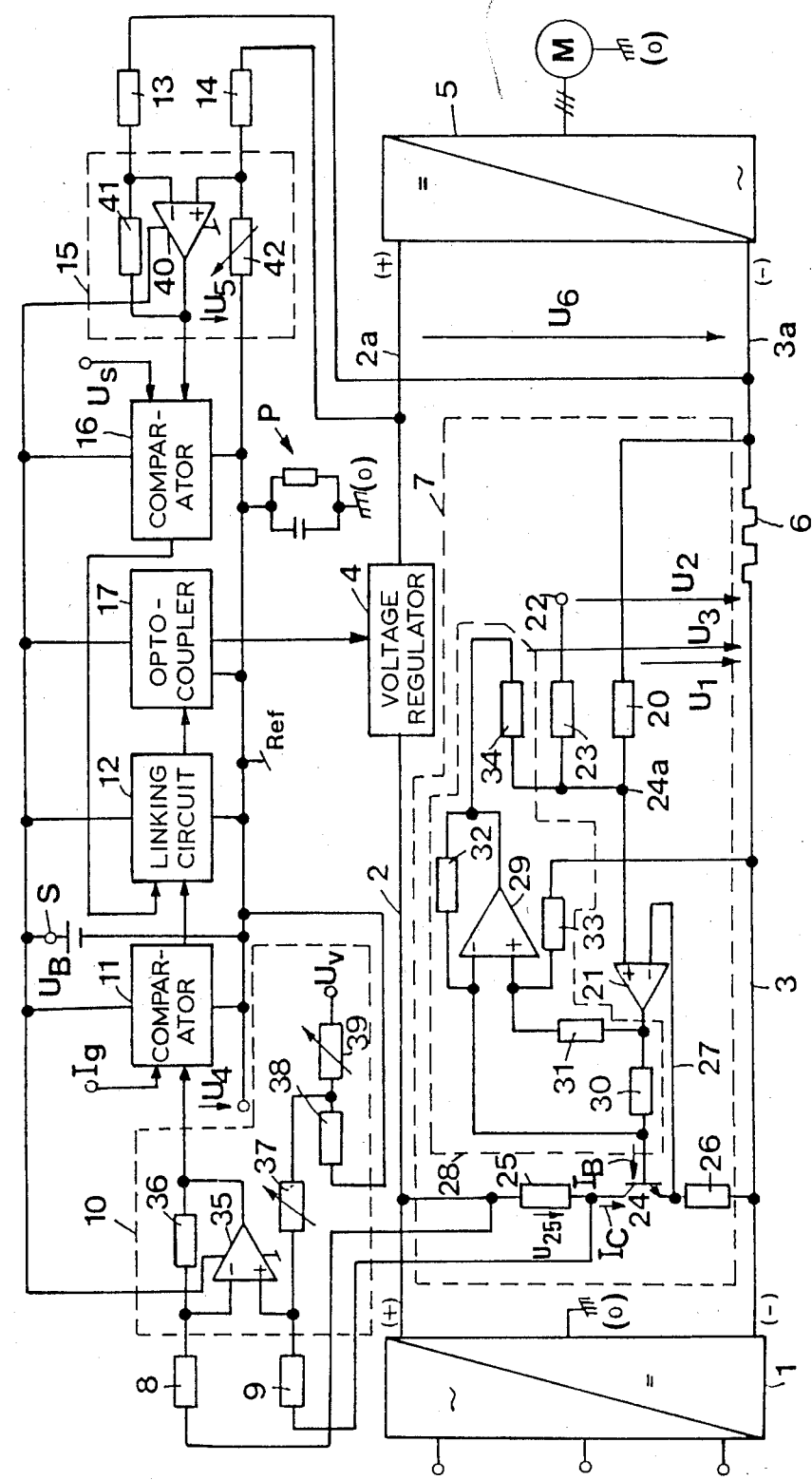

ELECTRICAL SHOCK PREVENTION MEANS FOR HIGH VOLTAGE DC REGULATORS

BACKGROUND AND FIELD OF THE INVENTION

The invention relates to an apparatus for supplying an electric consumer with a high DC voltage from a DC voltage source with positive and negative output potential relatively to earth potential, comprising an evaluating circuit which has its own operating voltage source between a current supply connection and a reference potential line and to which a measuring signal can be fed depending on the consumer voltage and/or the consumer current and which compares the measuring signal with a predetermined value and, depending on the result of the comparison, feeds a control signal by way of a separating stage to a setter influencing the consumer voltage, wherein the evaluating circuit has an operational amplifier for each measuring signal input, one input of the amplifier being preceded by a series resistor and the other input being connected to the reference potential line.

DESCRIPTION OF RELATED ART

In a known apparatus of this kind, the consumer voltage is regulated and/or the consumer current is limited by means of the evaluating circuit. This apparatus is, however, also suitable for regulating the current. The output side of the evaluating circuit is connected to the control input of the setter on the high voltage side by way of an expensive separating transformer constituting the separating stage. The series resistors of the evaluating circuit are comparatively low ohmic and are only in front of one input of each operational amplifier. The other inputs of the operational amplifiers are practically directly connected to one of the high tension transmission lines between the high voltage source and the consumer. The evaluating circuit is therefore likewise at a comparatively high potential and an operator will be in danger if he touches the evaluating circuit.

SUMMARY OF THE INVENTION

The invention is based on the problem of providing an apparatus of the aforementioned kind wherein simple means provide a high safety when touching the evaluating circuit.

According to the invention, this problem is solved in that the supply of the respective measuring signal to each measuring signal input of the evaluating circuit is effected by a respective high ohmic series resistor of about 7 to 11 megaohm, the reference potential line is connected to earth and the separating stage is an optocoupler.

In this construction, the input side of the evaluating circuit is, so to speak, galvanically separated from the high tension voltage and/or current measuring position so that the entire evaluating circuit is safe to touch. The series resistors are simple components, as is the optocoupler. There is also added safety against overloading semi-conductor elements on the input side of the evaluating circuit because the high ohmic series resistors appropriately limit the current and voltage.

Preferably, the high ohmic series resistors form a balanced bridge with a respective further resistor between the one input of the associated operational amplifier and its output, as well as a resistor between the other input and the reference potential line. The resistance bridge facilitates balancing out of synchonous interference signals which occur at the supply lines of the consumer, e.g. an inverse rectifier, are set up when using a DC source in the form of a mains rectifier and/or a setter in the form of a vibrator, even when using suitable smoothing circuits, and become particularly noticeable at high loads. The synchronous interference voltage is several times larger (for example in the order of 300 volt) the usual current measuring voltage (for example 0.1 to 0.5 volt) tapped from a consumer current measuring resistor disposed in the supply line. The further resistors which are low ohmic compared with the high ohmic series resistors also bring about a considerable reduction in voltage at the amplifier inputs by reason of voltage dividing.

Further, the resistor connected to the reference potential line can be adjustable at the operational amplifier in the evaluating circuit transmitting the voltage measuring signal. This permits balancing of the bridge on the side of the voltage measuring position for the best possible suppression of a synchronous interference signal.

The input side of the operational amplifier for the current measuring signal can be connected by its high ohmic series resistors to a resistor in the collector circuit of a transistor of which the base is subjected through a third operational amplifier to a current measuring signal from the current measuring position. This has the advantage that a small current measuring signal associated with a relatively large synchronous signal and derived from the current measuring position will be transformed to a current measuring signal which is high in relation to the synchronous signal and which can be readily transmitted through the high ohmic series resistors. Nevertheless, the third operational amplifier may comprise simple low voltage components because it can exhibit only a comparatively low potential relatively to that at the current measuring position, at the input as well as the output side.

However, the transistor could also be a high tension transistor and connected to the DC voltage source by its collector resistor. A separate operating voltage source for the transistor could possibly be dispensed with.

Further, the transistor may have a resistor in its emitter circuit and its emitter be connected directly to the reversing input of the third operational amplifier, the other input of the third operational amplifier being connected to the current measuring position and being applied to a biassing voltage. The transistor and the third operational amplifier therefore form a completely counter-coupled amplifier arrangement having the total amplifying factor '1' so that the voltage at the emitter resistor is linearly dependent on the input voltage of the third operational amplifier whereas the biassing voltage displaces the zero point to detect positive and negative consumer currents. The linear dependents of the emitter current on the current measuring voltage ensures that the collector current and thus the voltage drop at the collector resistor supplied to the evaluating circuit will depend linearly on the current measuring voltage.

The other input of the third operational amplifier can be connected to the tapping of a voltage divider between a terminal of a series voltage source and the current measuring position. This voltage divider permits the desired biassing voltage to be formed in a simple manner.

Since the emitter current and collector current of the transistor differ from each by the amount of the base current, the emitter current rather than the collector current will have a straight linear relationship to the current measuring position. To enble this departure of the collector current from the emitter current caused by the base current also to be corrected, it is preferred that the other input of the third operational amplifier be fed with a positive feedback signal proportional to the base current of the transistor. This positive feedback signal increases, in accordance with the base current, the voltage at the input of the operational amplifier and thus brings about by way of the emitter current an appropriate increase in the collector current. The collector current is therefore more accurately linearly dependent on the current measuring voltage.

More particularly, this can be achieved in that a measuring resistor between the output of the third operational amplifier and the base of the transistor has its voltage drop fed by way of a fourth operational amplifier to the other input of the third operational amplifier. By appropriately equipping the third operational amplifier with resistors of suitable sizes, the collector current can be very accurately linearly dependent on the current measuring voltage.

In addition, the input side of the second operational amplifier for the current measuring signal can be biassed by an amount which compensates the zero value displacement effected by the biassing voltage on the input side of the third operational amplifier. The biassing voltage of the second operational amplifier can be derived from the tapping of an adjustable voltage divider.

The tapping of the adjustable voltage divider may be connected to the other input of the second operational amplifier by way of the resistor between the said other input and the reference potential line.

It is possible for the reference potential line to be directly at earth potential. Preferably, however, a low ohmic resistor relatively to the series resistors is connected between the reference potential line and earth potential. This ensures that the potential of the reference potential line will remain low relatively to earth potential. Further, the measuring and control signal generators which are free of potential relatively to earth to have a reference potential different from earth can be connected without difficulty to the control terminals.

IN THE DRAWING

A preferred example of the invention will now be described in more detail with reference to the drawing.

DESCRIPTION OF A PREFERRED EMBODIMENT

In the illustrated example, a rectifier 1 in bridge circuit with smoothing circuit and centre-point earthing (o) causes a three-phase A.C. mains voltage, which is fed to the rectifier by way of a separating transformer (not shown) with a star point earthed on the secondary side, to be converted to a smoothed high voltage DC of about 600 volt. This DC voltage is fed by way of lines 2 and 3 to a setter 4, preferably a vibrator with smoothing circuit, and by way of lines 2a, 3a and a current measuring resistor 6 to a consumer in the form of an inverted rectifier 5 which, in turn, feeds an A.C. motor M.

The current measuring resistor 6 between the lines 3 and 3a forms a current measuring position and its voltage drop forms a current measuring signal of the consumer current. This current measuring signal is fed by way of a pre-amplifying arrangement 7, high ohmic resistors 8, 9 of about 7 to 11 megaohm and a transmission circuit 10 to a comparator 11 which compares the current measuring signal with a current limiting value $I_g$ and, when the current measuring signal exceeds the current limiting value $I_g$, feeds an output signal to a linking circuit 12.

At a voltage measuring position behind the setter 4, there is also derived the regulated DC voltage $U_6$ which is fed to the input of the inverted rectifier 5 and, by way of high ohmic resistors 13, 14 likewise of about 7 to 11 megaohm and a second transmission circuit 15 to a second comparator 16. The latter compares the voltage measuring signal fed to it with a desired voltage value $U_s$ and likewise feeds any different or control departure to the linking circuit 12. As long as the current limiting value $I_g$ is not exceeded, the linking circuit 12 feeds to an optocoupler 17 a signal which represents the voltage regulation departure. The optocoupler 17 transmits this signal to the control input of the setter 4 which thereupon so adjusts the DC voltage $U_6$ on the input side of the inverted rectifier 5 so that the voltage control departure disappears.

If, on the other hand, the current measuring signal does exceed the current limiting value $I_g$, the linking circuit 12 will, instead of any voltage control departure signal, transmit from the comparator 16 to the optocoupler 17 a signal of the comparator 11 that indicates exceeding of the current limiting value. This signal will then, by way of the setter 4, bring about such a reduction in the DC voltage $U_6$ on the input side of the inverted rectifier 5 that there will again be a drop below the current limiting value.

The evaluating circuit formed by the units 10, 11, 12, 15 and 16 and the optocoupler 17 have their own operating voltage source $U_B$ which, compared with the output voltage of the rectifier 1, is free from potential and is connected to a current supply terminal S and a reference potential line Ref of all the units 10, 11, 12, 15, 16 and 17. The reference potential line Ref is connected to earth (o) by way of a parallel RC element P of which the ohmic resistance is about 180 kiloohm and its condenser has about 100 nF.

The preamplifier arrangement 7 has its own operating voltage source (not shown) of which one pole is connected to a line 3. The preamplifier arrangement 7 permits amplification of the current measuring signal, particularly relatively to a synchronous interference signal occurring at the current measuring position, so that the voltage fed by the preamplifier arrangement 7 to the resistors 8, 9 can be more than 330 volt depending on the size of the consumer current. By reason of the high ohmic resistors 8, 9, the transmission circuit 10 does not become overloaded by such a high voltage because they have an appropriate current limiting effect or break down the voltage.

The voltage drop $U_1$ at the current measuring resistor 6 is fed by way of a resistor 20 to the non-inverting input (+) of an operational amplifier 21. A biassing voltage source between the line 3 and a terminal 22 of a voltage divider consisting of a resistor 23 and the resistor 20 produces a voltage $U_2$ which so biasses the input (+) connected to the tapping 24a of this voltage divider that it is possible to detect consumer currents which are positive and negative relatively to earth or zero potential (0). The output of the operational amplifier 21 is connected to the base of a transistor 24 of which the collector is connected to the line 2 by way of a relatively high ohmic resistor 25 of about 140 to 170 kiloohm and the emitter is connected to the line 3 by way of a relatively low ohmic resistor 26. The transistor 24 is therefore likewise fed from the DC voltage source 1 and is consequently in the form of a high tension transistor. It could, however, also be fed from an auxiliary voltage source of low voltage and designed for a correspondingly lower operating voltage.

A voltage which is proportional to the consumer current and considerably higher than the voltage drop at the current measuring resistor 6 is tapped at the resistor 25 and fed to the transmission circuit 10 by way of the resistors 8 and 9. To ensure that the voltage at the emitter resistor 26 is substantially the same as the voltage between the non-inverting input (+) of the operational amplifier 21 and the line 3a, so that the emitter current of transistor 24 will likewise be proportional to this voltage and thus to the measuring voltage $U_1$, the emitter of transistor 24 is connected by a line 27 directly to the inverting input (−) of operational amplifier 21. This corresponds to direct counter-coupling of the amplifier arrangement 21, 24 so that the latter exhibits the total amplification '1'. By neglecting the base current $I_B$ of the transistor 24, the emitter current $I_E$ is equal to the collector current $I_C$ of transistor 24. In that case the voltage drop $U_{25}$ at resistor 25 would also be substantially proportional to the consumer current. To achieve a high measuring accuracy, however, the base current is not negligible. It is therefore so fed back by way of a feedback circuit 28 to the non-inverting input (+) of operational amplifier 21 that the collector current $I_C$ is higher, in relation to an arrangement without this feedback circuit 28, by an amount corresponding to the base current without feedback circuit 28. For this purpose, the feedback circuit 28 contains an operational amplifier 29, a resistor 30 between the output of operational amplifier 21 and the base of transistor 24, a resistor 31 between the output of operational amplifier 21 and the non-inverting input (+) of operational amplifier 29, a direct connection between the base of transistor 24 and the inverting input (−) of operational amplifier 29, a resistor 32 between the inverting input (−) and the output of operational amplifier 29, a resistor 33 between the non-inverting input (+) of operational amplifier 29 and the line 3, as well as a resistor 34 between the output of operational amplifier 29 and the non-inverting input (+) of operational amplifier 21. The voltage drop occurring at resistor 30 is fed to the operational amplifier 29 as an approximation of the base current and, after amplification by the operational amplifier 29, is fed to the noninverting input (+) of operational amplifier 21 and thereby added to the consumer current measuring voltage $U_1$. This corresponds to a positive feedback and increase of the base current and thus a corresponding increase in the collector current of transistor 24.

If one designates the resistances of the resistors with the letter R and an index number which is the same as the reference numeral of the resistor in question, then, for the purpose of more accurately determining the resistances $R_{30}$ to $R_{34}$, the following equations will apply if $R_{30}=R_{31}$ and $R_{32}=R_{33}$ in order to make the output voltage $U_3$ of operational amplifier 29 independent of the base voltage of transistor 24:

$$U_3 = I_B \cdot R_{32} \tag{1}$$

$$I_C = I_E - I_B \tag{2}$$

$$I_C = \frac{U_1}{R_{26}\left(1 + \frac{R_{20}}{R_{23}} + \frac{R_{20}}{R_{34}}\right)} + \tag{3}$$

$$\frac{U_2}{R_{26}\left(1 + \frac{R_{23}}{R_{20}} + \frac{R_{23}}{R_{34}}\right)} + \frac{R_{32} \cdot I_B}{R_{26}\left(1 + \frac{R_{34}}{R_{20}} + \frac{R_{34}}{R_{23}}\right)} - I_B$$

In order that $I_C$ is only dependent on $U_1$ and $U_2$ (and, with the biassing voltage $U_2=0$, $I_C$ would only be dependent on $U_1$ or the consumer current measuring voltage), the last two elements in equation (3) will have to disappear, for which reason $$\frac{R_{32} \cdot I_B}{R_{26}\left(1 + \frac{R_{34}}{R_{20}} + \frac{R_{34}}{R_{23}}\right)} - I_B = 0 \tag{4}$$

It follows from equation (4) that $$\frac{R_{32}}{R_{26}} = 1 + R_{34}\left(\frac{1}{R_{20}} + \frac{1}{R_{23}}\right) \tag{5}$$

If one selects the following values
$R_{20}=2420$ Ohm
$R_{23}=53600$ Ohm
$R_{26}=187$ Ohm
$R_{30}=2200$ Ohm
$R_{31}=2200$ Ohm
$R_{32}=7500$ Ohm
$R_{33}=7500$ Ohm
$R_{34}=90900$ Ohm,
then $$\frac{R_{32}}{R_{26}} = 40{,}107 \tag{6}$$

$$1 + R_{34}\left(\frac{1}{R_{20}} + \frac{1}{R_{23}}\right) = 40{,}258, \tag{7}$$

which approximates the relationship of equation (5) and allows the last two elements in equation (3) to be disregarded. Thus, $$I_C = \frac{U_1}{200{,}42 \text{ Ohm}} + \frac{U_2}{4439{,}08 \text{ Ohm}}. \tag{8}$$

And if one selects $U_2$ to be 5 V, then $$I_C = K_1 \cdot U_1 + K_2 \tag{9}$$

wherein $K_1$ and $K_2$ are constants resulting from equation (8).

The collector current $I_C$ of transistor 24 is therefore dependent only on $U_1$ or the measuring voltage, irrespective of its base current $I_B$, wherein $K_2$ determines the zero point displacement.

The voltage drop $U_{25}$ at resistor 25 brought about by the collector current $I_C$ is thus likewise only dependent on $U_1$ and namely linearly thereto.

The transmission circuit 10 likewise contains an operational amplifier 35, a resistor 36 between the inverting input (−) and the output of operational amplifier 35, an adjustable resistor 37, and a voltage divider which is formed by resistors 38 and 39 of low ohmic resistance relatively to $R_{37}$ applied to a biassing voltage source having the output voltage $U_V = +12$ V. The resistor 37 lies between the non-inverting input (+) of operational amplifier 35 and the tapping of the voltage divider 38, 39 and the resistor 39 is likewise adjustable. The resistor 8 is connected to the inverting input (−) and the resistor 9 to the non-inverting input (+) of the operational amplifier 35. The output of operational amplifier 35 is connected to the one input of comparator 11. The resistances are so selected that, with $R_{38}//R_{39} << R_{37}$, $$\frac{R_8}{R_{36}} = \frac{R_{25} + R_9}{R_{37}}. \tag{10}$$

For the voltage $U_4$ between the output of operational amplifier 35 and the reference potential line Ref, the following equation applies:

$$U_4 = U_{38} - I_C \frac{R_{37}}{1 + \frac{R_9}{R_{25}}} \tag{11}$$

wherein $U_{38}$ is the fixed voltage set at the voltage divider resistor 38. $U_4$ is therefore independent of a synchronous interference voltage brought about between the collector of transistor 24 and line 3 by reason of any residual ripple at the output of DC voltage source 1 and/or a fluctuating load by the setter 4.

With the aid of the adjustable resistor 39, one so selects $U_{38}$ that the zero point displacement caused by the biassing voltage $U_2$ is balanced out again, i.e. with equations (8) and (11). Thus if $$U_{38} = \frac{U_2}{4439,08 \text{ Ohm}} \cdot \frac{R_{37}}{1 + \frac{R_9}{R_{25}}}. \tag{12}$$

and if one selects
$R_8 = 9100$ Kiloohm
$R_9 = 9100$ Kiloohm
$R_{25} = 154$ Kiloohm
$R_{37} = 101,692$ Kiloohm $$\left( = \frac{R_{25} + R_9}{R_8} \cdot R_{36} \right)$$

$R_{36} = 100$ Kiloohm,
then one obtains $U_{38} = U_2 \cdot 0.38123$ and $$U_4 = -\frac{U_1}{200,42 \text{ Ohm}} \cdot \frac{R_{37}}{1 + \frac{R_9}{R_{25}}} = -U_1 \cdot 8{,}4438. \tag{13}$$

In other words, the output voltage $U_4$ of transmission circuit 10 is directly proportional to $U_1$ and independent of any synchronous interference voltage.

The transmission circuit 15 likewise contains an operational amplifier 40, a resistor 41 between the inverting input (−) and the output of operational amplifier 40 and an adjustable resistor 42 between the non-inverting input (+) and the output of operational amplifier 40, the inputs of operational amplifier 40 also being connected by a respective one of resistors 13 and 14 to a respective one of the inputs of the inverted rectifier 5.

To enable the output voltage $U_5$ of the transmission circuit 15 between the output of the operational amplifier 40 and earth also to be kept independent of a synchronous interference voltage occurring between the input line 2a of the inverted rectifier 5 at a positive potential (+) and the line 3a, the resistances of resistors 13, 14, 41 and 42 (which form a bridge in the same way as resistors 8, 9, 36 and 37) are selected so that $$R_{13}/R_{14} = R_{41}/R_{42}. \tag{14}$$

It is then found that $$U_5 = U_6(R_{41}/R_{13}). \tag{15}$$

and if one selects
$R_{13} = 9100$ Kiloohm
$R_{14} = 9100$ Kiloohm
$R_{41} = 100$ Kiloohm
$R_{42} = 100$ Kiloohm,
then $$U_5 = U_6/91 \tag{16}$$

That is to say, directly proportional to, and merely dependent on, the DC voltage $U_6$ to be regulated.

Additional measuring and/or control signal generators can be connected free of potential relatively to the high tension portion 1 to 7 between the reference potential conductor Ref and the inputs of further evaluating units (not shown) which likewise act on the setter 4 by way of the optocoupler 17.

Instead of connecting the reference potential line Ref to earth (o), by way of the RC element P, it can also be connected directly to earth (o). The interposed RC element, however, permits the connection of such measuring or control signal generators which are substantially free of potential relatively to earth and are to remain so. It nevertheless ensures that the potential of the reference line Ref relatively to earth receives a defined safe low value. Thus, the high potential of line 2a of about +300 Volt drives a current through the resistors 14, 42 and the RC element P which causes a voltage drop of only about +6 Volt at the RC element. Even if the setter 4, which may for example be in the form of a vibrator, interrupts the connection between the lines 2 and 2a, the earth potential to a line 3a lying at a potential of about −300 Volt could impel a current through the RC element, the resistors 42, 14 and the inverted rectifier 5. This current would likewise result in a voltage drop of only about −6 Volt at the RC element P. Without a direct or indirect connection by way of the RC element between the reference potential line Ref and earth, the potential of the reference line Ref could however reach an excessively high value.

We claim:
1. Power supply apparatus for supplying an electric consumer with a high DC voltage from a DC voltage source with positive and negative output potentials relative to earth potential, comprising, evaluating circuit means having solid state components, a dedicated voltage source for said evaluating circuit means for supplying operating currents to said components, positive and negative supply lines having source terminals connectable to said DC voltage source and supply ter- minals connectable to said electric consumer, said supply lines having voltage control means, monitoring means for measuring currents and voltages at said supply terminals and generating at least one resulting signal, said evaluating circuit means having means for generating a reference signal and comparator means for comparing said reference signal and said at least one resulting signal and generaing a control signal, said evaluating circuit means having an optocoupler stage for directing said control signal to said supply lines voltage control means, operational amplifier means connected to said comparator means having an inverting input connected to said monitoring means and a noninverting input connected an earth potential reference, both of said inputs of said operational amplifier have high ohmic resistor means on the order of 7 to 11 megohms, feedback resistor means between the output of said operational amplifier and said inverting input thereof, reference resistor means between said noninverting input of said operational amplifier and a ground reference, said high ohmic resistor means along with said feedback resistor means and said reference resistor means forming a balanced bridge, said resulting signals include a current signal, said monitoring means includes a monitoring operational amplifier means having inverting and noninverting inputs and transistor means for generating said current signal, and said transistor means having a collector resistor from which said current signal is directed.

2. Power supply apparatus according to claim 1 wherein said transistor means includes a high tension transistor connected to said supply line ahead of said voltage control means.

3. Power supply apparatus according to claim 1 wherein said transistor means has a resistor in its emitter circuit and said emitter thereof is connected directly to said inverting input of said monitoring operational amplifier means, and sampling means directing a sampling part of said current flow in said supply lines to the noninverting input of said monitoring operational amplifier.

4. Power supply apparatus according to claim 3 wherein said sampling means includes a voltage divider means having a tap connected to said noninverting input of said monitoring an operational amplifier means, said voltage divider including resistor means having one end connected to said tap and the other end serving as a terminal to which a biasing voltage may be applied.

5. Power supply apparatus according to claim 4 wherein a feedback circuit means between the base of said transistor means and said tap provides a positive feedback signal to said noninverting input of said monitoring operational amplifier means proportional to the base current of said transistor.

6. Power supply apparatus according to claim 5 wherein said feedback circuit means includes a base resistor for said transistor and feedback operational amplifier means for sensing and directing the voltage drop across said base resistor to said noninverting input of said monitoring operational amplifier means.

7. Power supply apparatus according to claim 6 wherein said reference resistor means is adjustable to compensate a zero value displacement caused by a biasing voltage on said noninverting input of said monitoring operational amplifier means which results from a biasing voltage applied to said terminal.

8. Power supply apparatus according to claim 7 wherein said reference resistor means includes an adjustable voltage divider.

* * * * *